Sept. 20, 1927.

G. F. ROHN

POWER CABINET

Filed May 14, 1921

3 Sheets-Sheet 1

1,642,698

WITNESSES

INVENTOR

Sept. 20, 1927.
G. F. ROHN
POWER CABINET
Filed May 14, 1921
1,642,698
3 Sheets-Sheet 2
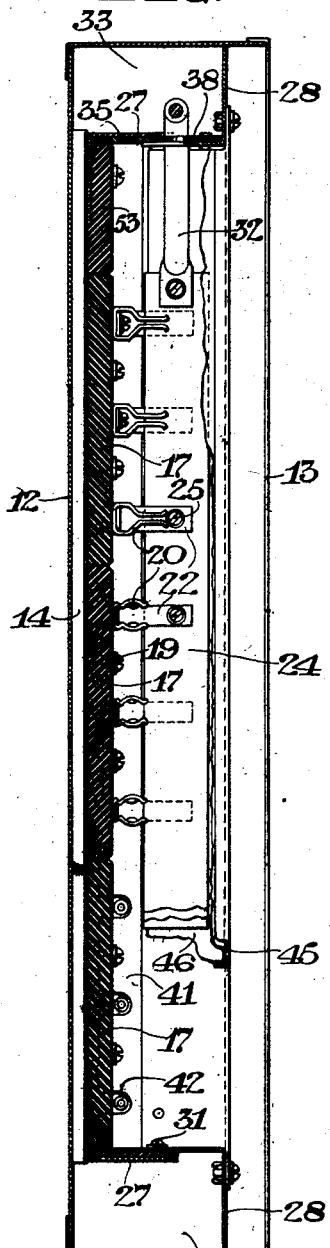
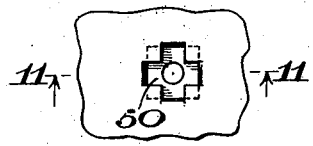
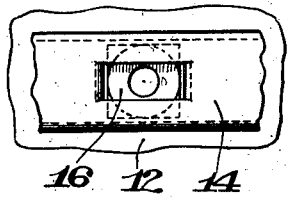
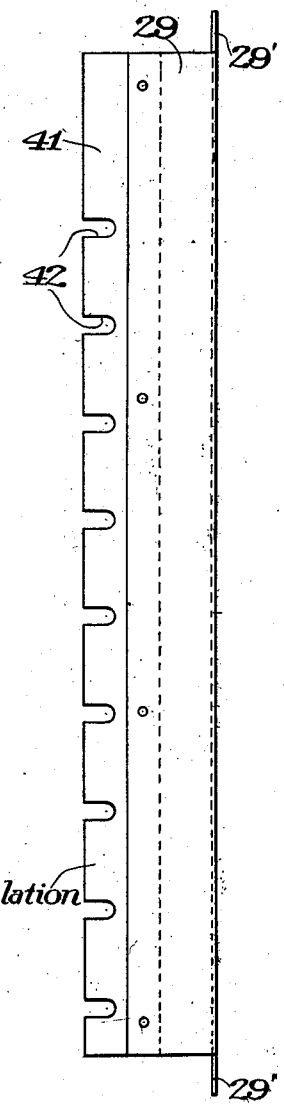
WITNESSES
INVENTOR
ATTORNEY Sept. 20, 1927. 1,642,698
G. F. ROHN
POWER CABINET
Filed May 14, 1921 3 Sheets-Sheet 3
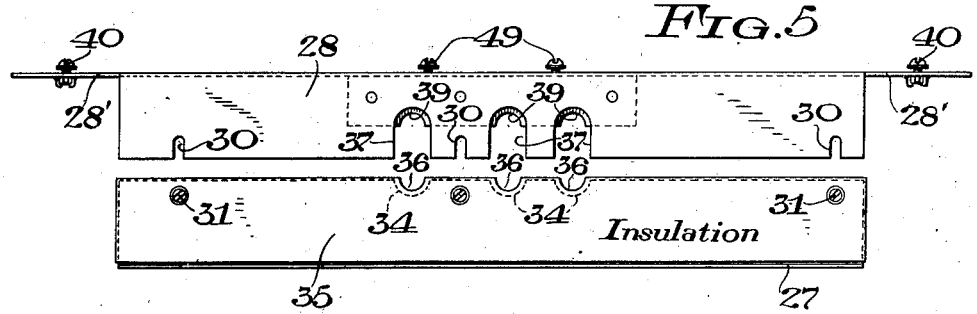
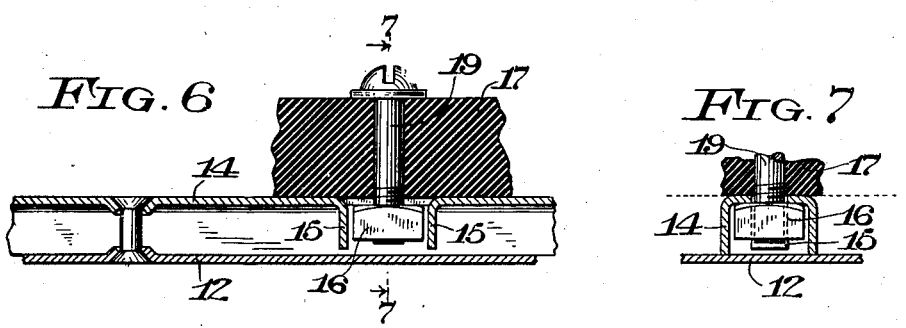
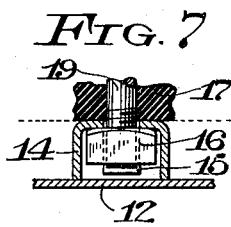
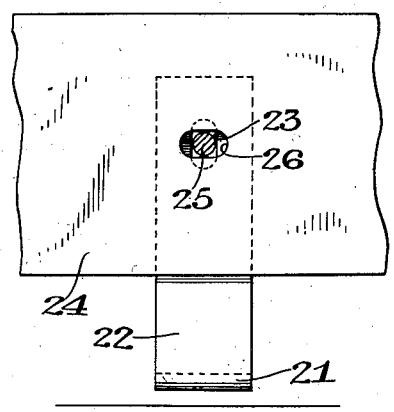
WITNESSES
H. D. Chase
C. L. Naal
INVENTOR
George F. Rohn,
By R. S. Caldwell.
ATTORNEY Patented Sept. 20, 1927.

1,642,698

UNITED STATES PATENT OFFICE.

GEORGE F. ROHN, OF MILWAUKEE, WISCONSIN, ASSIGNOR TO GEORGE F. ROHN ELECTRIC COMPANY, OF MILWAUKEE, WISCONSIN, A CORPORATION OF WISCONSIN.

POWER CABINET.

Application filed May 14, 1921. Serial No. 469,642.

The invention relates to power cabinets for electrical devices.

One of the objects of this invention is to provide a power cabinet with interchangeable panels for power-consuming devices of different capacities so that the panels may be readily renewed if the connections installed on it need repairing, so that blank panels may be provided to accommodate for subsequent power expansion and so that the panels may be rearranged in the cabinet.

A further object of the invention is to provide a mounting frame for the panels of simple and efficient construction.

A further object of the invention is to provide a wiring compartment in the cabinet by which the line wires are enclosed, and removable cover sections for this compartment.

A further object of the invention is to provide a removable protective cover for the bus-bars.

The invention further consists in the several features hereinafter set forth and more particularly defined by claims at the conclusion hereof.

Figure 1:
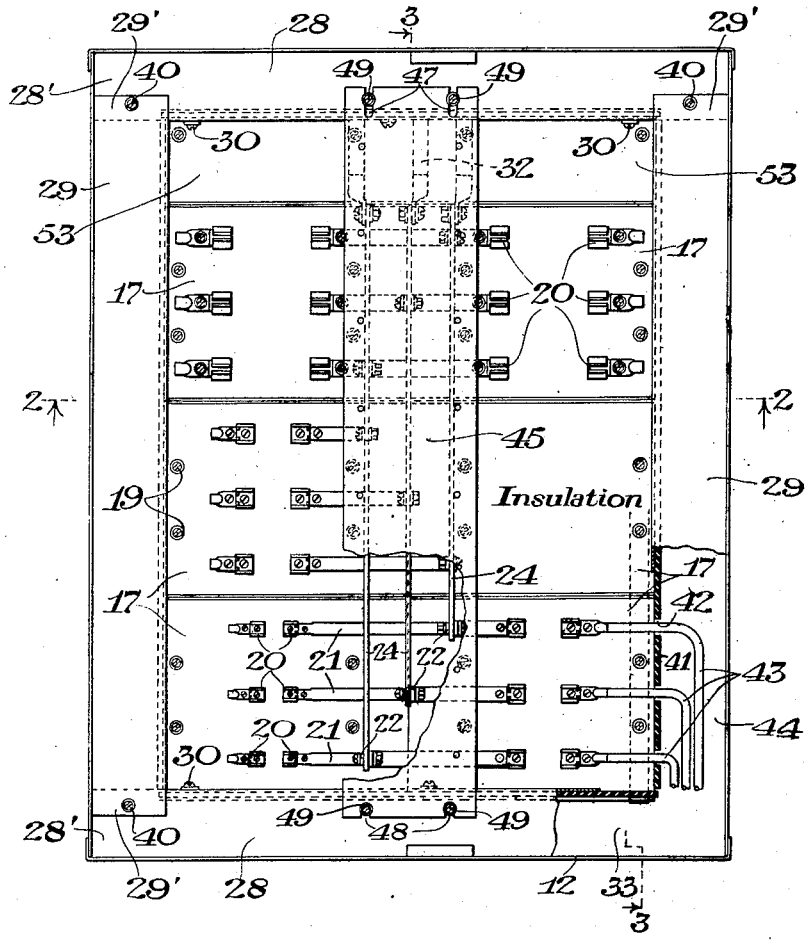
Figure 2:
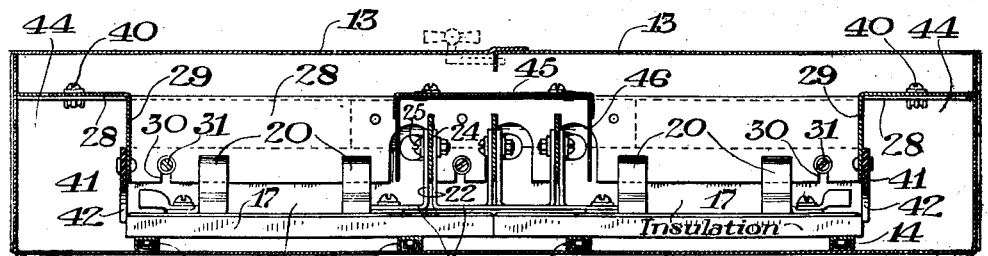

In the drawings: Fig. 1 is a plan view of a power cabinet embodying the invention, parts being broken away; Fig. 2 is a section taken on the line 2—2 of Fig. 1; Fig. 3 is a section taken on the line 3—3 of Fig. 1; Fig. 4 is a detail view of a portion of the wiring compartment; Fig. 5 is a detail view of another portion of the wiring compartment; Fig. 6 is a detail sectional view through a panel and the mounting frame; Fig. 7 is a section taken on the line 7—7 of Fig. 6; Fig. 8 is a detail view of the panel mounting; Fig. 9 is a detail view of the bus-bar connection; Fig. 10 is a front view of a nut mounting used in the cabinet; Fig. 11 is a section taken on the line 11—11 of Fig. 4.

The cabinet includes a sheet metal box 12 open at the front with one or more doors 13 hingedly connected to said box to cover the front thereof. A plurality of channel bars 14 are riveted to the bottom of the box with their flanges resting on the bottom wall of the box, see Fig. 6. At spaced intervals along the web of the channel a pair of tongues 15 are punched out of said web and project downwardly into the space formed by the channel or panel mounting bar. These tongues with the web of the channel and the bottom of the box cooperate to form pockets for receiving nuts 16, the width of the tongues being less than the width of the nuts, see Fig. 8.

A series of panels 17 rest upon each set of mounting bars 14 and are secured thereto by machine screws 19 passing through the panels and engaging with the nuts 16 in the mounting bars, the nuts being somewhat loosely mounted in the pockets formed as above described, to allow for variations in the alinement and spacing of the screws 19. Each panel may be equipped with the usual fuse clamps 20 and, as shown, each panel is equipped for fuses for a three-phase motor circuit. It will also be noted that the panels carry fuse clamps of different capacities to provide for connection with motors or other current-consuming devices of larger or smaller current consumption, though the fuse clamps for each panel are spaced the same distance apart. One of each set of fuse clamps is provided with a flat strip connector 21 which has its outer end 22 bent to an upright position and provided with a vertically extending slot 23, see Fig. 9. The connectors 21 have their ends secured to the bus-bars 24 by screw bolts 25 passing through horizontally extending slots 26 in said bars and the slots 23. These elongated slots 23 and 26 permit ready attachment of the bus-bars to the fuse connectors without providing an exact fit. The connectors 21 form the support for the bus-bars and are made detachable so that they may be removed with the panel. Some of the panels may be blanks so that the subsequent addition of motors to the plant equipment may be taken care of. By providing a separate removable panel for each motor or other electrical device the panels may be interchanged, removed for the purpose of repair, or new panels may be added to the cabinet or substituted for others in the cabinet to take care of the various power requirements of the plant.

The wiring compartment surrounds the space occupied by the panels and is formed between the bottom and sides of the box 12 and end plates 27 and cover plates 28 both at the ends and cover plates 29 at the sides. The end plates 27 are of sheet metal of angle form, one of the angles being clamped between the mounting bars 14 and the panels, see Fig. 3, by the screws securing the panels to the bars.

The cover plates 28 are of sheet metal of angle form with extended tops 28', and are provided with slots 30 whereby they may be slipped on screws 31 on the upright portions of the end plates 27, and by which said plates 28 are removably mounted on the plates 27. The supply cables 32 which connect with the bus-bars are lead into the cabinet through either of the wiring compartments 33 formed between the plates 27, 28 and the bottom and sides of the box. The end plates 27 are each provided with curved notches 34 and a strip of insulating material 35 provided with similar notches 36 is secured to each plate, the notches 36 being of smaller diameter than the notches 34 to form insulated cable receiving recesses. The cover plates 28 are provided with slots 37 having curved upper ends, and a strip 38 of insulating material provided with curved notches 39 is secured to each plate, the notches 39 being smaller than the curved ends of the slots 37 to form insulated cable receiving recesses. The notches 36 and 39 are complementary so that when the plates 27 and 28 are secured in place insulated openings are provided through which the cables 32 pass. Access to the cables may be easily obtained by removing the cover plates 28.

The side cover plates 29 are of sheet metal of angle form, having extended tops 29' resting on and removably secured to the extended tops 28' of the plates 28 by screws 40. These plates 29 have strips 41 of insulating material depending from the lower edges thereof and provided with slots 42 through which the cables 43 leading to the current consuming devices pass into the wiring compartments 44 formed between the plates 28 and the bottom and sides of the box. As the cover plates 29 rest upon the cover plates 28 and they in turn are supported by the end plates 27, the end plates 27 form supports for all the cover plates of the wiring compartments.

A protective covering for the bus-bars 24 is formed by a sheet metal top plate 45 provided with an insulating lining 46 which depends below the plate 45 to form side coverings for said bars. This covering is removably secured to the plates 28 by providing slots 47 and 48 at opposite ends thereof to receive screws 49 carried by the plates 28. The slots 47 are made longer than the slots 48 so that the covering may be readily slipped into place beneath the heads of the screws 49.

The screws 31, 40 and 49 screw into nuts 50 secured to the plates, as shown in Figs. 10 and 11, by punching out sets of tongues 51 and 52 and crimping over the tongues 51 against the nuts. This avoids the necessity of tapping holes in the plates and secures a longer thread than could be obtained in the relatively thin plates.

The removal of the cover plates affords unobstructed access for the manipulation of the wires in the space surrounding the panels since there are no transverse supports of any kind projecting across or above this space for mounting the cover plates because the entire cover structure is well supported on the end plates 27 at the ends of the panel group.

I desire it to be understood that this invention is not to be limited to any specific form or arrangement of parts except in so far as such limitations are specified in the claims.

What I claim as my invention is:

1. In a power cabinet, the combination of a casing having a back wall, panel mounting members secured to said back wall, panels mounted on said members and spaced from the walls of said casing to form a wiring space, end plates of angle shape each having one flange secured between a panel and said mounting members and having the other flange extending outwardly adjacent the edge of said panel to form the inner side of said wiring space, and removable angle plates supported by the projecting flanges of said end plates and co-operating with the walls of the casing to form wiring compartments.

2. In a power cabinet, the combination of a casing having a back wall, plates disposed within the casing in spaced substantially parallel relation to the sides of the casing to form the inner walls of a wiring space, means for securing said plates to the back wall of the casing, angle plates having flange portions overlapping and extending longitudinally of said first-named plates, and means for removably securing said angle plates to said first-named plates, said angle plates and first-named plates co-operating with the sides of said casing to form marginal wiring compartments.

3. In a power cabinet, the combination with a casing having a panel space, a bus-bar group centrally arranged adjacent said panel space, plates secured to said casing at opposite ends of said panel space, a channel member forming a shield for said bus-bar group and supported at its ends on said plates, and a channel-shaped insulating lining for said channel member having its flanges disposed on opposite sides of said bus-bar group.

4. In a power cabinet, the combination with a casing having a panel space, of a bus-bar group centrally arranged adjacent said space, supporting plates disposed within said casing at opposite ends of said panel space, and a channel member supported at its ends on said plates and forming a protective covering for said bus-bars with its flanges disposed on opposite sides of said bus-bar group.

5. In a power cabinet, a wiring compartment having its inner side formed of separate cooperating plates having complementary notches, the notches of these plates registering to form cable conductor passages, insulating strips secured to said plates and forming an insulating lining for said notches, and means for detachably connecting said plates together to permit ready placement of said cables.

6. In a power cabinet, the combination, with a casing having a marginal wiring compartment formed of separate co-operating plates, insulating strips secured to said plates and each provided with complementary notches forming substantially cylindrical cable conducting passages when said strips are in juxtaposition, and means for detachably securing said plates together to permit ready placement of said cables in said passages.

In testimony whereof, I affix my signature.

GEORGE F. ROHN.